United States Patent
DiTomasso et al.

(10) Patent No.: US 10,473,028 B2
(45) Date of Patent: Nov. 12, 2019

(54) CLUTCHED COMPRESSOR SECTION FOR GAS TURBINE ENGINE

(71) Applicant: United Technologies Corporation, Farmington, CT (US)

(72) Inventors: John C. DiTomasso, Glastonbury, CT (US); Enzo DiBenedetto, Berlin, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 122 days.

(21) Appl. No.: 15/651,497

(22) Filed: Jul. 17, 2017

(65) Prior Publication Data
US 2019/0017436 A1   Jan. 17, 2019

(51) Int. Cl.
| | | |
|---|---|---|
| F01D 5/00 | (2006.01) | |
| F02C 3/113 | (2006.01) | |
| F04D 29/26 | (2006.01) | |
| F02C 9/00 | (2006.01) | |
| F04D 29/053 | (2006.01) | |
| F16D 27/10 | (2006.01) | |
| F16D 35/00 | (2006.01) | |
| F01D 5/06 | (2006.01) | |
| F04D 19/02 | (2006.01) | |

(Continued)

(52) U.S. Cl.
CPC .............. *F02C 3/113* (2013.01); *F01D 5/066* (2013.01); *F02C 7/36* (2013.01); *F02C 9/00* (2013.01); *F04D 19/026* (2013.01); *F04D 25/02* (2013.01); *F04D 29/053* (2013.01); *F04D 29/266* (2013.01); *F16D 27/10* (2013.01); *F16D 35/00* (2013.01); *F05D 2220/323* (2013.01); *F05D 2220/3219* (2013.01); *F05D 2240/20* (2013.01); *F05D 2260/404* (2013.01); *F05D 2260/4023* (2013.01); *F05D 2270/112* (2013.01)

(58) Field of Classification Search
CPC .... F02C 3/113; F02C 7/36; F02C 9/00; F01D 5/066; F04D 19/026; F04D 25/02; F04D 29/053; F04D 29/266; F16D 27/10; F16D 35/00; F05D 2220/3219; F05D 2220/323; F05D 2240/20
See application file for complete search history.

(56) References Cited

U.S. PATENT DOCUMENTS

| | | |
|---|---|---|
| 2,659,528 A | 11/1953 | Price |
| 2,820,588 A | 1/1958 | Penn et al. |
| 8,251,639 B2 | 8/2012 | Talan |

(Continued)

FOREIGN PATENT DOCUMENTS

GB            974600 A     11/1964

OTHER PUBLICATIONS

Search Report regarding related EP App. No. 18 171919; dated Dec. 17, 2018; 7 pgs.

*Primary Examiner* — Thomas N Moulis
(74) *Attorney, Agent, or Firm* — Cantor Colburn LLP

(57) ABSTRACT

A clutched compressor section of a gas turbine engine coupled to a rotor shaft. The clutched compressor section includes at least one decoupleable rotor stage, the decoupleable rotor stage switchable between a coupled condition and a decoupled condition with a clutch mechanism, the coupled condition coupling the decoupleable rotor stage with the rotor shaft, the decoupled condition decoupling the decoupleable rotor stage from the rotor shaft.

15 Claims, 2 Drawing Sheets

(51) Int. Cl.
    *F04D 25/02*         (2006.01)
    *F02C 7/36*          (2006.01)

(56) References Cited

U.S. PATENT DOCUMENTS

| | | | |
|---|---|---|---|
| 8,863,529 B2* | 10/2014 | Starr | F01D 17/141 |
| | | | 60/772 |
| 8,887,485 B2 | 11/2014 | Ress, Jr. | |
| 8,935,912 B2 | 1/2015 | Norris et al. | |
| 2009/0314003 A1 | 12/2009 | Talan | |
| 2010/0154383 A1* | 6/2010 | Ress, Jr. | F02C 7/36 |
| | | | 60/226.3 |
| 2011/0038737 A1* | 2/2011 | Conry | F04D 17/14 |
| | | | 417/53 |
| 2013/0133332 A1* | 5/2013 | MacFarlane | F02C 7/36 |
| | | | 60/773 |

* cited by examiner

CLUTCHED COMPRESSOR SECTION FOR GAS TURBINE ENGINE

STATEMENT OF FEDERAL SUPPORT

This invention was made with Government support under Contract No. FA8650-15-D-2502/0002 awarded by the United States Air Force. The Government has certain rights in the invention.

BACKGROUND

Exemplary embodiments pertain to the art of gas turbine engines and, more particularly, to compressor sections of gas turbine engines.

As gas turbine engine compressor pressure ratios and internal temperatures continue to increase throughout a larger and wider operating envelope, material capabilities in the rear of the high pressure compressor start to become a limiting factor. If the high temperatures cannot be mitigated with large or complex air coolers, then flight restrictions will be needed.

BRIEF DESCRIPTION

Disclosed is a clutched compressor section of a gas turbine engine coupled to a rotor shaft. The clutched compressor section includes at least one decoupleable rotor stage, the decoupleable rotor stage switchable between a coupled condition and a decoupled condition with a clutch mechanism, the coupled condition coupling the decoupleable rotor stage with the rotor shaft, the decoupled condition decoupling the decoupleable rotor stage from the rotor shaft.

In addition to one or more of the features described above, or as an alternative, further embodiments may include a plurality of compressor rotor stages axially spaced from each other and operatively coupled to each other, the at least one decoupleable rotor stage being one of the plurality of compressor rotor stages. Also included is a group of stages of the plurality of compressor rotor stages coupled to each other and to the rotor shaft, the at least one decoupleable rotor stage coupled to the group of stages in the coupled condition and decoupled from the group of stages in the decoupled condition, the decoupled condition allowing the decoupleable rotor stage to freely rotate independently of the group of stages.

In addition to one or more of the features described above, or as an alternative, further embodiments may include that the decoupleable stage is located downstream of the group of stages.

In addition to one or more of the features described above, or as an alternative, further embodiments may include that the decoupleable stage is coupled to a shaft that is coaxially oriented with the rotor shaft.

In addition to one or more of the features described above, or as an alternative, further embodiments may include that the clutch mechanism includes a first engagement member extending from a disk of one of the stages of the group of stages. The clutch mechanism also includes a second engagement member extending from a disk of the decoupleable stage, the relative position of the first engagement member and the second engagement member determining if the decoupleable stage and the group of stages are in the coupled condition or the decoupled condition.

In addition to one or more of the features described above, or as an alternative, further embodiments may include that the first engagement member and the second engagement member are disposed in an interference fit condition in the coupled condition, wherein a threshold centrifugal force overcomes the interference fit condition to dispose the first engagement member and the second engagement member in the decoupled condition.

In addition to one or more of the features described above, or as an alternative, further embodiments may include that the relative position of the first engagement member and the second engagement member is controlled with an electromagnetic field applied proximate the clutch mechanism.

In addition to one or more of the features described above, or as an alternative, further embodiments may include that the electromagnetic field is generated from a stator pack located proximate the clutch mechanism.

In addition to one or more of the features described above, or as an alternative, further embodiments may include that the first engagement member and the second engagement member are aero-viscously coupled to each other.

In addition to one or more of the features described above, or as an alternative, further embodiments may include that the decoupled condition is provided when the rotational speed of the rotor shaft exceeds a predetermined speed to reduce fluid compression and compressor temperature.

In addition to one or more of the features described above, or as an alternative, further embodiments may include that the plurality of rotor stages are part of a high pressure compressor.

Also disclosed is a gas turbine engine including a compressor section, a combustor section, and a turbine section. Also included is a rotor shaft coupling the compressor section and the turbine section. Further included is at least one rotor stage of the compressor section that is decoupleable from the rotor shaft with a clutch mechanism configured to switch between a coupled condition and a decoupled condition.

In addition to one or more of the features described above, or as an alternative, further embodiments may include a plurality of compressor rotor stages axially spaced from each other and operatively coupled to each other, the at least one decoupleable rotor stage being one of the plurality of compressor rotor stages. Also included is a group of stages of the plurality of compressor rotor stages coupled to each other and to the rotor shaft, the at least one decoupleable rotor stage coupled to the group of stages in the coupled condition and decoupled from the group of stages in the decoupled condition, the decoupled condition allowing the decoupleable rotor stage to freely rotate independently of the group of stages.

In addition to one or more of the features described above, or as an alternative, further embodiments may include that the clutch mechanism includes a first engagement member extending from a disk of one of the rotor stages. The clutch mechanism also includes a second engagement member extending from a disk of the decoupleable stage, the relative position of the first engagement member and the second engagement member determining if the decoupleable stage and the remainder of the stages are in the coupled condition or the decoupled condition.

In addition to one or more of the features described above, or as an alternative, further embodiments may include that the decoupleable stage is located downstream of the remainder of stages.

In addition to one or more of the features described above, or as an alternative, further embodiments may include that each of the remainder of the stages are coupled to each other and to a rotor shaft that directly drives the remainder of the stages.

In addition to one or more of the features described above, or as an alternative, further embodiments may include that the decoupleable stage is coupled to a shaft that is coaxially oriented with the rotor shaft.

In addition to one or more of the features described above, or as an alternative, further embodiments may include that the first engagement member and the second engagement member are disposed in an interference fit condition in the coupled condition, wherein a threshold centrifugal force overcomes the interference fit condition to dispose the first engagement member and the second engagement member in the decoupled condition.

In addition to one or more of the features described above, or as an alternative, further embodiments may include that the relative position of the first engagement member and the second engagement member is controlled with an electromagnetic field applied proximate the clutch mechanism.

Further disclosed is a method of controlling a temperature of a gas turbine engine compressor section. The method includes driving rotation of a plurality of compressor rotor stages with a rotor shaft coupled to the rotor stages. The method also includes selectively coupling and decoupling at least one decoupleable compressor rotor stage with the plurality of compressor rotor stages to provide a coupled condition and a decoupled condition, the coupled condition driving the decoupleable compressor rotor stage with the rotor shaft.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
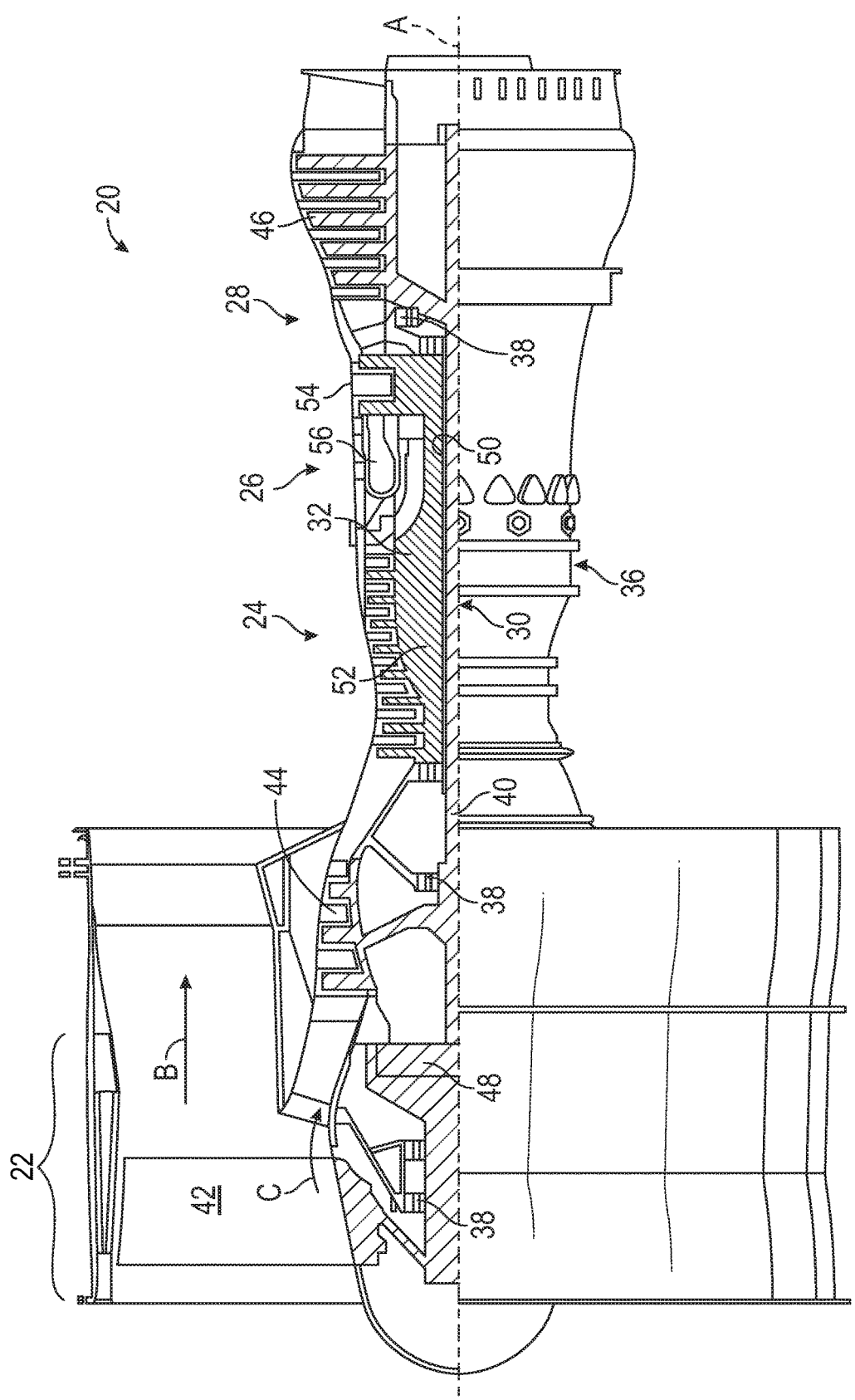
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 m/sec).

The compressor section 24 includes a plurality of variable vanes. The variable vanes are positioned on a sync ring (not shown) and the orientation of the variable vanes is controlled by an actuator system. In particular, multiple vanes are disposed circumferentially about the compressor section 24 along, and operatively coupled to, a sync ring that synchronizes articulation of the variable vanes.

Figure 2:
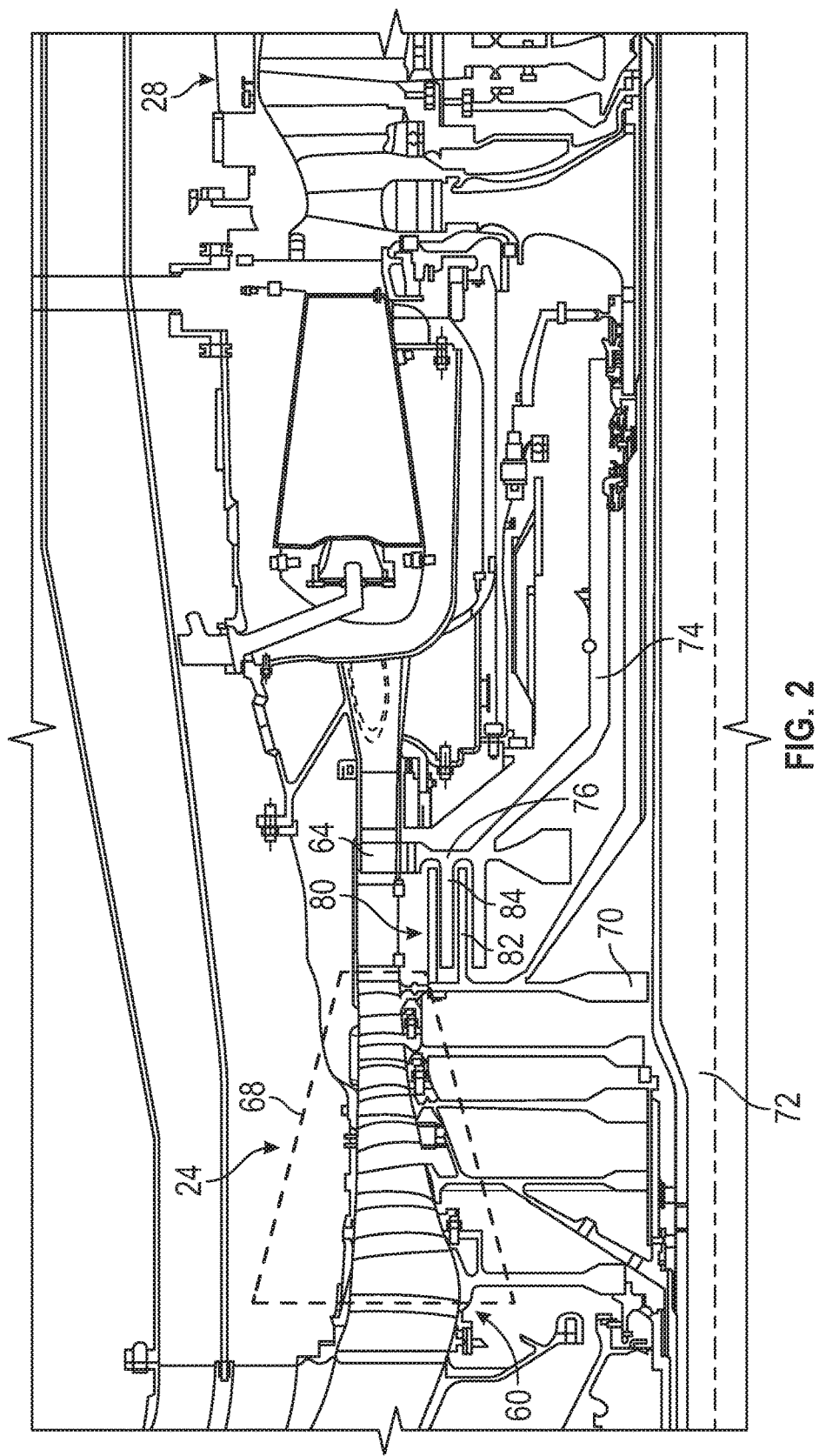
FIG. 2 is a sectional view of a compressor section of the gas turbine engine.

Referring to FIG. 2, a portion of the compressor section 24 is shown in greater detail. In some embodiments, the portion of the compressor section 24 is the high pressure compressor 52. The compressor section 24 includes a plurality of rotor stages 60 axially spaced from each other. Each rotor stage 60 includes a plurality of airfoils that are circumferentially spaced from each other. In the sectional view, a single rotor from each stage is illustrated. It is to be appreciated that more or fewer stages may be present in various embodiments. In the orientation of FIG. 2, fluid is routed through the compressor section 24 from left to right and compressed therein. Therefore, rotor stages are considered "downstream" relative to other stages that are shown to the left in the illustration.

At high speed operation of the compressor section 24 under certain operating conditions, pressure ratio and temperature must be mitigated. To reduce the temperature, a clutch mechanism 80 described herein allows one or more of the plurality of rotor stages 60 to be decoupled from the remainder of the rotor stages 60. In the illustrated embodiment, a single rotor stage 64 is decoupleable from the remainder of the rotor stages 68 and may be referred to herein as a decoupleable rotor stage 64, but it is to be appreciated that more than one rotor stage may be decoupleable from the remainder of the rotor stages 68. The remainder of the rotor stages 68 may also be referred to as a group of rotor stages 68. In the illustrated embodiment, the decoupleable rotor stage 64 is a last stage of the rotor stages 60, such that it is located axially downstream of the remainder of the rotor stages 68. The aft portion of the compressor section 24 typically is subjected to the highest temperature, such that avoiding fluid compressive work in this region is beneficial, as described herein.

In one embodiment, each of the remainder of rotor stages 68 are coupled to a rotor shaft 72, via respective disks 70, that directly drives rotation of the remainder of rotor stages 68 during operation of the turbine section 28. In other words, rotation of the rotor shaft 72 always results in rotation of the remainder of rotor stages 68. As will be appreciated from the disclosure herein, the decoupleable rotor stage 64 is switchable between a coupled condition and a decoupled condition. In the coupled condition, the decoupleable rotor stage 64 is also rotationally driven by the rotor shaft 72 and is commonly rotated with the remainder of the rotor stages 68. The rotation is driven by a coupled connection with the remainder of rotor stages 68. In the decoupled condition, the decoupleable rotor stage 64 is disengaged from the remainder of rotor stages 68 and is free to rotate independently of the rotor shaft 72. The decoupleable rotor stage 68 is operatively coupled to a shaft 74, via a disk 76, the shaft 74 being coaxially aligned with the rotor shaft 72 and concentrically positioned thereabout. In an alternative embodiment, the rotation of a decoupleable rotor stage 64 may be driven directly a by connection with the rotor shaft 72 when in the coupled condition such that the clutch mechanism 80 is situated between the decoupleable rotor stage 64 and the rotor shaft 72 without any other rotor stages 68 situated therebetween.

The clutch mechanism 80 includes a first engagement member 82 and a second engagement member 84 that are engageable with each other. The first engagement member 82 is operatively coupled to, or integrally formed with, one of the disks 70 of the remainder of rotor stages 68. The second engagement member 84 is operatively coupled to, or integrally formed with, the disk 76 of the decoupleable rotor stage 64. The first and second engagement members 82, 84 extend toward each other and are in an overlapping condition, such that the length of each member extends past each other to define an overlapped region of the members. The engagement members 82, 84 may be formed in any suitable shape, such as a substantial cylinder extending at least partially about the rotor shaft 72.

The relative position of the engagement members 82, 84 determines whether the decoupleable rotor stage 64 is in the coupled or decoupled condition. Various embodiments of the clutch mechanism 80 are contemplated. In some embodiments, the engagement members 82, 84 are disposed in an interference fit condition in the coupled condition. In such an embodiment, the interference fit is loosened or eliminated once the rotational speed of the compressor section 24 provides a centrifugal force that exceeds a threshold force by radially growing or moving one of the engagement members 82, 84, relative to the other. In some embodiments, components such as pawls or the like may be included on one or both of the engagement members 82, 84, with the centrifugal force disengaging these components once the threshold force is exceeded. Once the speed is reduced, the centrifugal force is reduced, thereby facilitating re-engagement of the components to reposition the clutch mechanism 80 into the coupled condition. Alternatively, the engagement members 82, 84 may be configured so that the interference fit is increased once the rotational speed of the compressor section 24 provides a centrifugal force that exceeds a threshold force by radially growing or moving one of the engagement members 82, 84, relative to the other. In this alternative embodiment, once the speed is reduced, the centrifugal force is reduced, thereby facilitating dis-engagement of the components to reposition the clutch mechanism 80 into the decoupled condition.

In other embodiments, an electromagnetic field is utilized to control the relative position of the engagement members 82, 84, thereby controlling the coupled or decoupled conditions. Many contemplated components and locations of the electromagnetic field are suitable. In one embodiment, the electromagnetic field is generated from a stator pack located proximate the clutch mechanism 80. Additionally, it is contemplated that the engagement members 82, 84 are coupled aero-viscously.

In operation, the at least one decoupleable rotor stage 64 is driven by the rotor shaft 72 in the coupled condition and not driven by the rotor shaft 72 in the decoupled condition. In the coupled condition, the decoupleable rotor stage 64 provides compressive work. In one embodiment, the decoupleable rotor stage 64 is able to spin freely when in the decoupled condition due to the connected relationship to shaft 76, but is not adding any work or subsequent temperature rise to the fluid. The independent spinning allows for close speed matching as the main compressor speed is reduced and recounting of stage 64 and stages 68 occurs, thus improving durability. Alternatively, the decoupleable rotor stage 64 may be locked into an aerodynamically ideal rotational position that optimizes operation when locked and also when started back up and when in coupled condition. The selectively coupleable nature of stage 64 can avoid unnecessary compression, thereby reducing the temperature within the compressor section 24.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A clutched compressor section of a gas turbine engine coupled to a rotor shaft, comprising:
   at least one decoupleable rotor stage, the decoupleable rotor stage switchable between a coupled condition and a decoupled condition with a clutch mechanism, the coupled condition coupling the decoupleable rotor stage with the rotor shaft, the decoupled condition decoupling the decoupleable rotor stage from the rotor shaft;
   a plurality of compressor rotor stages axially spaced from each other and operatively coupled to each other, the at least one decoupleable rotor stage being one of the plurality of compressor rotor stages; and
   a group of stages of the plurality of compressor rotor stages coupled to each other and to the rotor shaft, the at least one decoupleable rotor stage coupled to the group of stages in the coupled condition and decoupled from the group of stages in the decoupled condition, the decoupled condition allowing the decoupleable rotor stage to freely rotate independently of the group of stages, the clutch mechanism comprising:
      a first engagement member extending from a disk of one of the stages of the group of stages; and
      a second engagement member extending from a disk of the decoupleable stage, the relative position of the first engagement member and the second engagement member determining if the decoupleable stage and the group of stages are in the coupled condition or the decoupled condition.

2. The clutched compressor section of claim 1, wherein the decoupleable stage is located downstream of the group of stages.

3. The clutched compressor section of claim 1, wherein the decoupleable stage is coupled to a shaft that is coaxially oriented with the rotor shaft.

4. The clutched compressor section of claim 1, wherein the first engagement member and the second engagement member are disposed in an interference fit condition in the coupled condition, wherein a threshold centrifugal force overcomes the interference fit condition to dispose the first engagement member and the second engagement member in the decoupled condition.

5. The clutched compressor section of claim 1, wherein the relative position of the first engagement member and the second engagement member is controlled with an electromagnetic field applied proximate the clutch mechanism.

6. The clutched compressor section of claim 5, wherein the electromagnetic field is generated from a stator pack located proximate the clutch mechanism.

7. The clutched compressor section of claim 1, wherein the first engagement member and the second engagement member are aero-viscously coupled to each other.

8. The clutched compressor section of claim 1, wherein the decoupled condition is provided when the rotational speed of the rotor shaft exceeds a predetermined speed to reduce fluid compression and compressor temperature.

9. The clutched compressor section of claim 1, wherein the plurality of rotor stages are part of a high pressure compressor.

10. A gas turbine engine comprising:
    a compressor section;
    a combustor section;
    a turbine section;
    a rotor shaft coupling the compressor section and the turbine section;
    at least one rotor stage of the compressor section that is decoupleable from the rotor shaft with a clutch mechanism configured to switch between a coupled condition and a decoupled condition;
    a plurality of compressor rotor stages axially spaced from each other and operatively coupled to each other, the at least one decoupleable rotor stage being one of the plurality of compressor rotor stages; and
    a group of stages of the plurality of compressor rotor stages coupled to each other and to the rotor shaft, the at least one decoupleable rotor stage coupled to the group of stages in the coupled condition and decoupled from the group of stages in the decoupled condition, the decoupled condition allowing the decoupleable rotor stage to freely rotate independently of the group of stages, the clutch mechanism comprising:
       a first engagement member extending from a disk of one of the rotor stages; and
       a second engagement member extending from a disk of the decoupleable stage, the relative position of the first engagement member and the second engagement member determining if the decoupleable stage and the remainder of the stages are in the coupled condition or the decoupled condition.

11. The gas turbine engine of claim 10, wherein the decoupleable stage is located downstream of the remainder of stages.

12. The gas turbine engine of claim 10, wherein each of the remainder of the stages are coupled to each other and to a rotor shaft that directly drives the remainder of the stages.

13. The gas turbine engine of claim 12, wherein the decoupleable stage is coupled to a shaft that is coaxially oriented with the rotor shaft.

14. The gas turbine engine of claim 10, wherein the first engagement member and the second engagement member are disposed in an interference fit condition in the coupled condition, wherein a threshold centrifugal force overcomes the interference fit condition to dispose the first engagement member and the second engagement member in the decoupled condition.

15. The gas turbine engine of claim 14, wherein the relative position of the first engagement member and the second engagement member is controlled with an electromagnetic field applied proximate the clutch mechanism.

* * * * *